United States Patent [19]
Churchill

[11] 4,414,633
[45] Nov. 8, 1983

[54] DATA PROCESSING AND RECORDING APPARATUS

[75] Inventor: David A. Churchill, Leamington Spa, England

[73] Assignee: British Gas Corporation, London, England

[21] Appl. No.: 237,764

[22] Filed: Feb. 24, 1981

[30] Foreign Application Priority Data

Nov. 17, 1980 [GB] United Kingdom ................ 8036798

[51] Int. Cl.³ ............................................ G06F 15/20
[52] U.S. Cl. .................................. 364/510; 364/551
[58] Field of Search ............... 364/510, 550, 551, 552, 364/492, 483

[56] References Cited

U.S. PATENT DOCUMENTS

| | | | |
|---|---|---|---|
| 3,855,456 | 12/1974 | Summers et al. | 364/492 |
| 4,155,252 | 5/1979 | Morrill | 364/492 X |
| 4,184,205 | 1/1980 | Morrow | 364/550 X |
| 4,253,151 | 2/1981 | Bouve | 364/492 X |
| 4,291,376 | 9/1981 | McCahill | 364/492 X |
| 4,334,275 | 1/1982 | Levine | 364/551 |

*Primary Examiner*—Edward J. Wise
*Attorney, Agent, or Firm*—Oblon, Fisher, Spivak, McClelland & Maier

[57] ABSTRACT

A low-cost data logging device, particularly suitable for recording gas meter performance having an electrical transducer to produce an electrical analogue of a parameter to be recorded, a calculator circuit to perform an analysis of measurements of the parameter and a plurality of memories to store the results of the analyses.

3 Claims, 4 Drawing Figures

2
1
4
3
SCAN ENCODER
ROM
8
13
CLOCK
TIMER CIRCUIT
12
5
INPUT REGISTER
ARITHMETIC UNIT
6
7
10
ACCU-MULATOR
MEMORY
9
OUTPUT ENCODER
OUTPUT
11
DC SOURCE
14

INPUT CIRCUIT
15
16
1

TRANSDUCERS

DATA PROCESSING AND RECORDING APPARATUS

BACKGROUND OF THE INVENTION

1. Field of the Invention:

This invention relates to data processing and recording apparatus and, in particular, to apparatus for recording information about the flow of fluids through a metering device such as a gas flow meter.

2. Description of the Prior Art:

Information concerning daily or hourly variations in load for industrial or commercial consumers is of considerable value, inter alia, for monitoring or controlling peak daily loads, checking the correct dimensioning of meter installations, checking spare meter capacity available for load increases and the determination of standard load factors to assist in the design of new installations.

Hitherto such data have been collected manually or by means of conventional data logging equipment. However, such applications have been limited to special cases because of the relatively high costs involved.

In order to extend the range of applications for which it is feasible to employ data logging methods a new, simple data recording apparatus has been devised.

SUMMARY OF THE INVENTION

According to the present invention there is provided data recording apparatus comprising transducer means to produce an electrical signal representative of the magnitude of a parameter to be recorded, digital analyzing means to determine whether or not the magnitude of the parameter falls within predetermined limits and a plurality of data storage means each corresponding to a range between predetermined limits of said parameter to record the incidence of a measurement of said parameter within the respective predetermined limits.

According to a further aspect of the invention, the data recording apparatus includes timing means to permit the measurement of said parameter at predetermined intervals.

According to a yet further aspect of the invention there is provided means associated with said data recording apparatus to prepare a permanent record of successive measurements of said parameter.

BRIEF DESCRIPTION OF THE DRAWINGS

Embodiments of the invention will now be particularly described by way of example with reference to the accompanying drawings, in which.

DETAILED DESCRIPTION OF THE PREFERRED EMBODIMENTS

Figure 1:
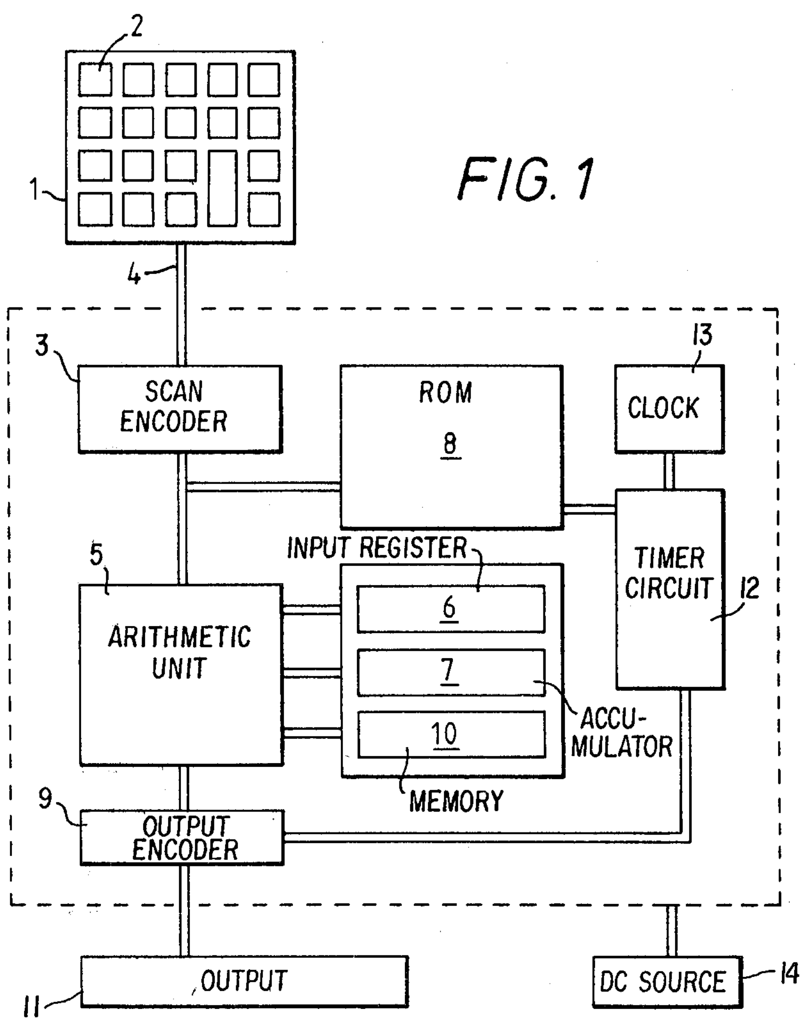
FIG. 1 shows the architecture of a calculator circuit suitable for incorporation in data recording apparatus in accordance with the present invention.

Referring now to FIG. 1 of the drawings, a calculator circuit incorporates a keyboard 1 having a plurality of keys 2 for input of data and program instructions. The keyboard is linked to a scan encoder 3 by way of a bus 4 consisting of a plurality of scan lines connected in matrix fashion to the keys. An arithmetic unit 5 in association with an input register 6 and an accumulator 7 performs various operations on the input data under the control of programs stored in a memory 8. The memory may comprise ROM (Read Only Memory) for standard operations such as addition, subtraction and exponentiation which are called up by respective function keys on the keyboard or RAM (Random Access Memory) in which the steps of an individual program may be entered. An output encoder 9 transfers the processed data from a temporary store 10 to an output device 11 which may be a seven-segment digital display or a printer. Timer circuits 12 and a clock 13 synchronize the movement of data within the calculator circuit. Power is supplied from a DC source 14 which may be a battery or a mains unit.

Figure 2:
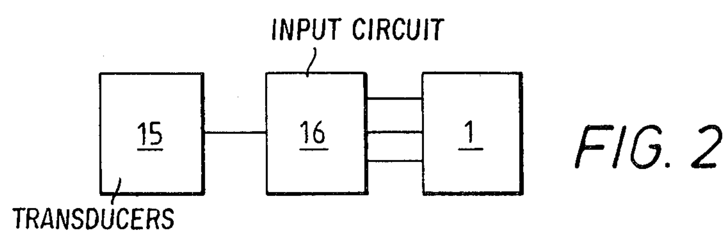
FIG. 2 shows data recording apparatus incorporating the calculator circuit illustrated in FIG. 1, and, FIGS. 3*a* and 3*b* show typical printouts produced by data recording apparatus in accordance with a particular aspect of the invention.

With data recording apparatus in accordance with the embodiment of the invention depicted in FIG. 2 a gas flow recording meter has a transducer 15 which provides an electrical signal corresponding to the mechanical meter reading. This signal may typically be a digital pulse emitted whenever a predetermined quantity of gas has passed through the meter.

In one embodiment, the digital pulse was fed via an input circuit 16 to simulate the operation of selected keys whereby a section of program within the calculator was initiated so that, by reference to the calculator clock, the interval between pulses was timed and data stored in various registers according to the flow rate passing through the meter at the time. A typical field measurement is shown in Table 1.

TABLE 1

| Meter size 140,000 ft$^3$/hr tested over 21 days | | | | | |
|---|---|---|---|---|---|
| Flow range % of meter capacity | 0–20 | 20–40 | 40–60 | 60–80 | 80–100 |
| % of flow recorded in range | 2.5 | 78 | 19.5 | 0 | 0 |

In a further embodiment a clock gave a timing pulse at predetermined intervals (1 day) and the pulses were used to activate successive memories to record the flow passed by the meter during successive time intervals. As the number of memories was finite, data were transformed to individual memories in a cyclic fashion so that data from the most recent measurements were preserved.

Using the programming capabilities of the calculator circuit analyses of the data can be performed and a summary of the results stored in the memories. For example one simple program recorded maximum hourly load, minimum hourly load, number of hours in which flow exceeded a predetermined rate, number of hours in which flow was below a second predetermined rate and the total flow.

Preferably the keyboard unit is detachable by means of a plug and socket connection, thereby obviating the possibility of the data processing program being inadvertently altered by an unskilled person.

Figures 3A, 3B:
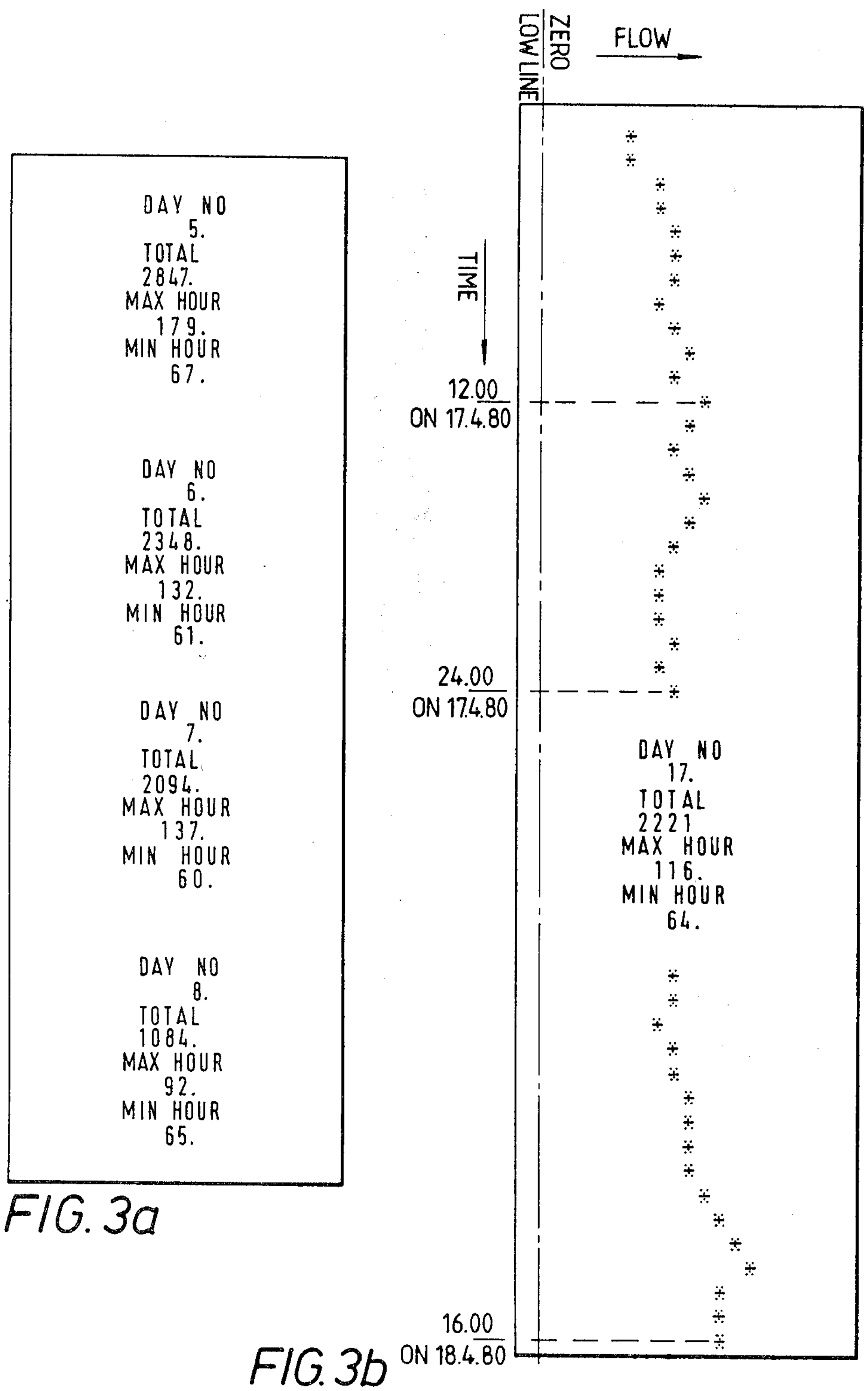

A further embodiment included a thermal printer which recorded successive readings. Typical printouts are shown in FIGS. 3*a* and 3*b* which shows outputs in numeric and graphical formats respectively.

I claim:

1. A gas flow rate recording apparatus comprising:

transducer means located in a gas supply line which provides an electrical signal having a pulse frequency representative of the magnitude of the parameter being measured, said parameter falling into one or a range of predetermined upper and lower limits and a plurality of data storage memories, each corresponding to one specific range of said parameter limits to record the incidence of a measurement of said parameter within the respective predetermined ranges.

2. A gas flow rate recording apparatus as claimed in claim 1 further including timing means to permit the periodic recording of said parameter.

3. A gas flow rate recording apparatus as claimed in claim 1 further including printing means to produce a permanent record of the measurement of said parameter.

* * * * *